UNITED STATES PATENT OFFICE.

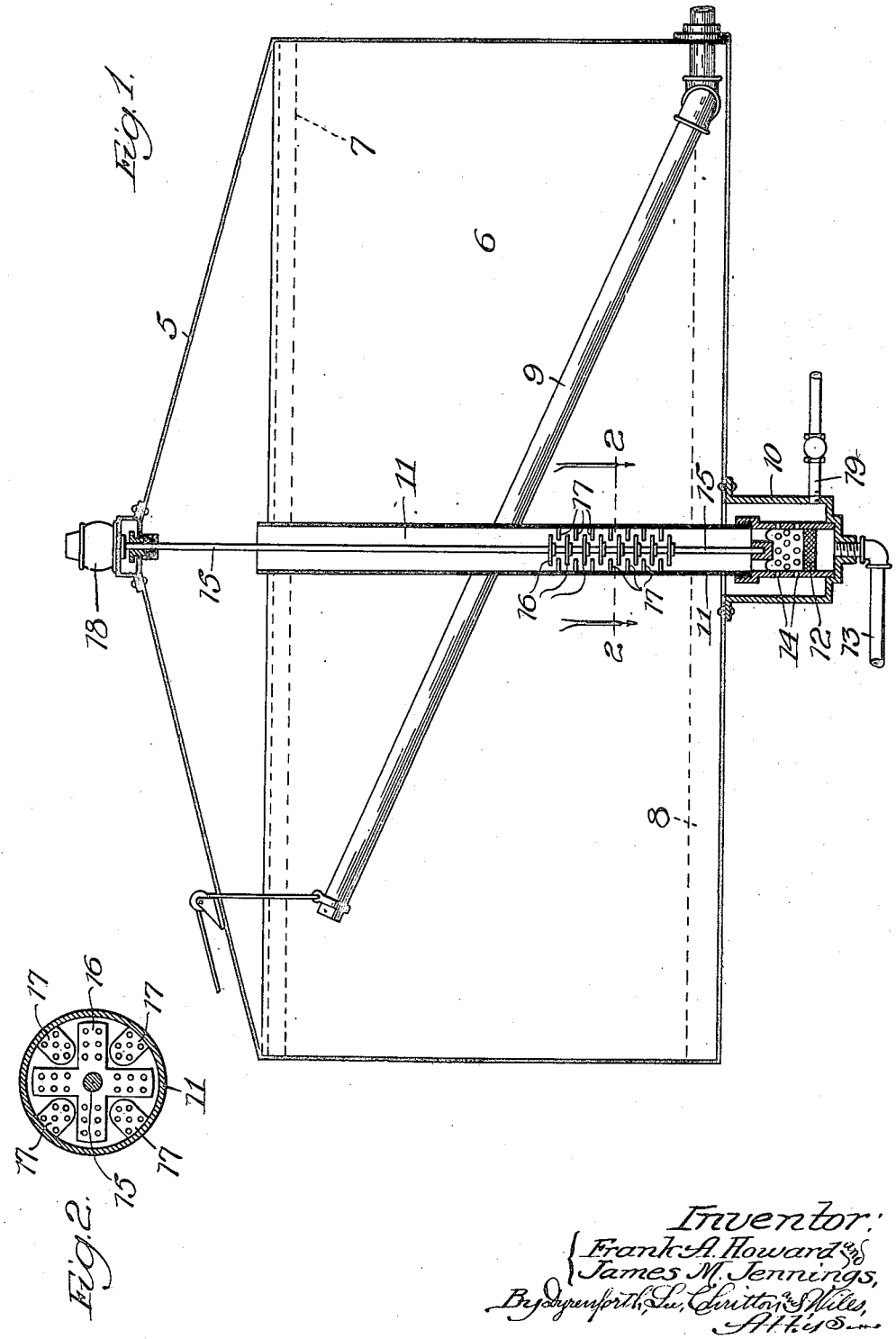

FRANK A. HOWARD, OF WESTFIELD, AND JAMES M. JENNINGS, OF ELIZABETH, NEW JERSEY, ASSIGNORS TO STANDARD OIL COMPANY, OF BAYONNE, NEW JERSEY, A CORPORATION OF NEW JERSEY.

PREVENTION OF EVAPORATION.

1,415,352.  Specification of Letters Patent.  Patented May 9, 1922.

Application filed April 12, 1920. Serial No. 373,455.

*To all whom it may concern:*

Be it known that we, FRANK A. HOWARD and JAMES M. JENNINGS, citizens of the United States, residing at Westfield, New Jersey, and Elizabeth, New Jersey, respectively, in the county of Union and State of New Jersey, have invented a new and useful Improvement in Prevention of Evaporation, of which the following is a specification.

The present invention relates to the storage of volatile liquids and more particularly to means for preventing the evaporation thereof. It is more particularly directed to the prevention of evaporation of gasoline, crude petroleum and similar volatile liquids immiscible with water from storage tanks containing the same, for example, of the usual vented type. The invention will be clearly understood from the following specification, in which a method for carrying it out is described, and from the illustration of a means provided for carrying out the process of the invention as shown in the accompanying drawing.

In the drawing

Figure 1 is a sectional view through a storage tank for example, of the ordinary vented type, provided with means for carrying out the present invention, and Figure 2 is a sectional view on line 2—2 of Figure 1.

In the storage of large quantities of volatile liquids, such as gasoline or crude oil, material losses are caused by evaporation from the liquid, and by the so-called "breathing" effect due to the expansion and contraction of the air in the clearance space of the tank with changes in temperature of the surrounding atmosphere, for example, from day to night. It will be readily perceived that in large storage tanks, having a diameter of 90 to 120 feet and containing as much as two million gallons of the volatile liquid, any loss by evaporation, even though slight as compared with the total amount of liquid in the tank, is of very considerable economic importance.

In accordance with the present invention, evaporation from the surface of the liquid is to a great extent prevented by maintaining upon the surface of the liquid a covering blanket of a froth or foam, the gaseous constituent of which may be air or an inert gas such as carbon dioxid. It is preferred that the liquid constituent of the foam or froth be immiscible in the stored liquid such as gasoline. A suitable liquid for the formation of such a froth may be obtained by dissolving in water a small percentage, (approximately 2 to 5 percent) of gelatine, and if desired, a very small percentage (0.1 percent, for example) of a soluble antiseptic agent such as mercuric chloride. Other froth forming materials which may be dissolved in the aqueous vehicle are glucose, saponins, soap bark extract, soluble soaps, etc.

As the foams produced from such solutions are in general more or less unstable, the foam upon the surface of the stored liquid tends to break to a greater or less extent, and the liquid thus set free from the foam, by the action of gravity, passes downward through the body of stored liquid of lighter specific gravity and deposits in the bottom of the tank. In accordance with the present invention I may provide means for collecting the deposited foam-forming liquid and regenerating a foam therefrom, which is again supplied to the surface of the liquid.

Referring more particularly to the drawings, the numeral 5 indicates a suitable storage tank, in which is stored a relatively large quantity of a volatile liquid such as gasoline, indicated by the numeral 6. The numeral 7 indicates a surface covering or layer of foam, which is maintained upon the surface of the gasoline to a substantially uniform depth, preferably of about 6", and is continuous over the entire surface of the liquid. This layer of foam has as its base a foam-forming liquid of the character above described, and the liquid deposited by the breaking of the foam, being of greater specific gravity than the stored liquid or gasoline, passes downwardly through the latter and collects in the bottom of the tank in an aqueous layer indicated by the numeral 8. The numeral 9 indicates the customary swing-pipe for the removal of the gasoline from the tank, and for the admission of gasoline into the tank.

In order that the deposited liquid may be collected and regenerated to a foam, to be returned to the surface of the liquid, there is formed in the bottom of the tank a well or sump 10, preferably at approximately the center of the tank. Within this well is placed a central stand-pipe or column 11, which is fitted liquid-tight into the bottom of the well 10 and which extends upwardly to a point at or slightly above the highest level to be reached by the liquid. A short distance above the bottom of this stand-pipe a porous plate 12, preferably of ceramic material, is inserted in the stand-pipe, a chamber being thereby formed in the bottom of the stand-pipe, into which enters an air or gas-pipe 13. Above this plate, but below the level of the foam-forming liquid in the bottom of the tank, a number of perforations 14 are provided in the stand-pipe 11, to permit the entrance of the foam-forming liquid into the stand-pipe above the plate 12. Air, or carbon dioxide is forced through the pipe 13 into the air chamber in the base of the stand-pipe, and, after being dispersed in a finely divided state by passage through the porous plate 12, it enters the foam-forming liquid in the stand-pipe in relatively small bubbles, producing thereby a froth or foam which gradually works its way up through the stand-pipe and discharges over the top on to the surface of the stored liquid.

It has been found that in the foam or froth formed in this manner, that is, by forcing small gas bubbles into the foam-forming liquid, the bubbles of the dispersed gas tend to coalesce, and by their buoyancy escape from the foam, rendering it highly unstable. In accordance with the present invention this tendency is to a great extent counteracted by increasing the fineness of dispersion of the air bubbles in the foam before it is discharged on to the surface of the stored liquid. This may be effected, as illustrated in the drawing, by mounting centrally within the stand-pipe a rotatable shaft 15, to which are attached, above the point of initial formation of the foam, a number of spaced breaker members 16, which may be formed as star-shaped sheet-metal plates provided with numerous perforations. Between these spaced breaker members there are attached to the interior wall of the stand-pipe internally projecting, perforated lugs or plates 17. The central shaft 15, together with the attached breaker members may be rotated by any suitable means, for example, by the motor 18. The coarse foam produced by the passage of the air bubbles into the foam-forming liquid passes in a stream upwardly between and through the rotating breaker members attached to the shaft 15 and the stationary breaker members attached to the internal wall of the stand-pipe 11 and is thereby subjected to a rapidly repeated mechanical breaking and cutting action, as a result of which the degree of dispersion of the gas particles in the liquid vehicle is greatly increased and a much finer grained and more stable form is produced.

As is readily apparent, foam may be applied to the surface of the stored liquid continuously, in amounts sufficient to compensate for the breaking of the foam thereupon, or it may be added intermittently, when the depth of foam above the stored liquid reaches a predetermined minimum, for example 6". In general, air is the gas most readily available and suitable for the formation of foam; however, in the case of highly inflammable liquids, an oxygen-free gas, such as carbon dioxide or nitrogen may be utilized in the formation of the foam, such gas having the additional advantage of not oxidizing the foaming agents. The foam may be supplied in each tank in the manner described, by utilizing the deposited liquid in the tank itself. If desired, however, the foam may be produced outside of the tank, for example, at a central station, and supplied to the surface of the gasoline in the tank by any suitable means. Means for the supply and discharge of foam-forming liquid to and from the bottom of the tank may be supplied, such as the valved pipe indicated by the numeral 19 on the drawings.

Although the present invention has been described in connection with certain details of the method for carrying it into effect, and specific details of apparatus employed having likewise been described, it is not intended that these shall be regarded as limitations upon the scope of the invention except in so far as included in the accompanying claims.

We claim:—

1. The method of preventing the evaporation of liquids confined in suitable storage containers, which consists in maintaining thereupon a layer of foam, thereby retaining the liquid in substantially its original state.

2. The method of preventing the evaporation of liquids confined in suitable storage containers, which consists in maintaining thereupon a layer of foam having as its base a liquid insoluble in the stored liquid, thereby retaining the liquid in substantially its original state.

3. The method of preventing the evaporation of liquids confined in a suitable storage container, which consists in forming thereupon a continuous layer of unstable foam having as a base a liquid insoluble in the stored liquid and supplying foam to maintain said foam layer thereupon, thereby retaining the liquid in substantially its original state.

4. The method of preventing the evaporation of liquids confined in a suitable storage container, which consists in forming thereupon a layer of unstable foam having as a base a liquid insoluble in and heavier than the stored liquid, collecting the foam-forming liquid deposited by the breaking of the foam from the bottom of the container, regenerating foam therefrom and returning it to the surface of the liquid.

5. The method of preventing the evaporation of liquids confined in a suitable storage container, which consists in supplying foam upon the surface of the liquid to form a substantially continuous layer covering the same, collecting the foam-forming liquid deposited by the breaking of the foam, regenerating the foam therefrom and returning it to the surface of the liquid.

6. The method of preventing the evaporation of gasoline confined in a storage tank, which consists in maintaining thereupon a layer of foam having as its base an aqueous liquid thereby retaining the gasoline in substantially its original state.

7. The method of preventing the evaporation of gasoline confined in a storage tank, which consists in supplying a foam having an aqueous liquid base upon the surface of the gasoline to form a substantially continuous layer covering the same, collecting in the bottom of the container the aqueous liquid deposited by the breaking of the foam, regenerating foam therefrom and returning it to the surface of the gasoline.

8. The method of preventing the evaporation of gasoline confined in a storage tank, which consists in forming a continuous layer of foam having an aqueous liquid base upon the surface of the gasoline, and supplying foam to said layer to maintain it of substantially constant depth.

9. The process of forming a fine-grained foam consisting in forcing finely divided gas particles into a foam-forming liquid, and subjecting the coarse foam thus formed to a mechanical breaking action.

10. The process of forming a fine-grained foam which consists in continuously forming a foam, causing it to move in a stream and subjecting it during its movement to a mechanical breaking action.

11. In combination with a storage tank for gasoline and similar liquids, means for supplying foam to the surface of the gasoline in said tank and means for collecting deposited liquid from the bottom of said tank, regenerating it into foam and returning it to the foam supplying means.

12. In combination with a storage tank for gasoline and similar liquids, a pipe adapted to discharge into said tank above the level of gasoline therein, means for admitting liquid from the bottom of the tank into the pipe, and means for forcing air bubbles upwardly through the liquid in the stand-pipe to produce and discharge a foam.

13. In combination with a storage tank for gasoline and similar liquids, a central stand-pipe extending from the bottom of said tank to a point above the gasoline level therein, said stand-pipe being provided with openings near the bottom of the tank for the admission of liquid into the pipe, and means for forcing air bubbles upwardly through the liquid in the stand-pipe to produce and discharge a foam.

14. A foam-forming device comprising means for containing a liquid and means for forcing air bubbles thereinto to produce a coarse foam in combination with means for subjecting said foam to a mechanical breaking action to produce a fine foam.

15. A foam-producing and discharging device comprising a pipe, a porous plate near the bottom of said pipe, means for introducing liquid into said pipe above said plate and means for introducing air below said plate, a rotatable shaft mounted in said pipe above the liquid level therein, cutting and breaking members secured to said shaft, and means for rotating said shaft.

16. A foam-producing and discharging device comprising a pipe, a porous plate near the bottom of said pipe, means for introducing liquid into said pipe above said plate and means for introducing air below said plate, a rotatable shaft, spaced cutting and breaking members attached to said shaft above the liquid level in said pipe, cutting and breaking members affixed to said pipe between said spaced cutting and breaking members and means for rotating the shaft.

FRANK A. HOWARD.
JAMES M. JENNINGS.